June 27, 1933.  L. P. CROSMAN  1,915,296
REGISTER
Filed Aug. 22, 1931  11 Sheets-Sheet 1

INVENTOR
Loring P. Crosman
BY
Stuart Hilder
ATTORNEY

June 27, 1933. L. P. CROSMAN 1,915,296
REGISTER
Filed Aug. 22, 1931 11 Sheets-Sheet 2

INVENTOR
Loring P. Crosman
BY
Stuart Hilder
ATTORNEY

June 27, 1933. L. P. CROSMAN 1,915,296
REGISTER
Filed Aug. 22, 1931 11 Sheets-Sheet 6
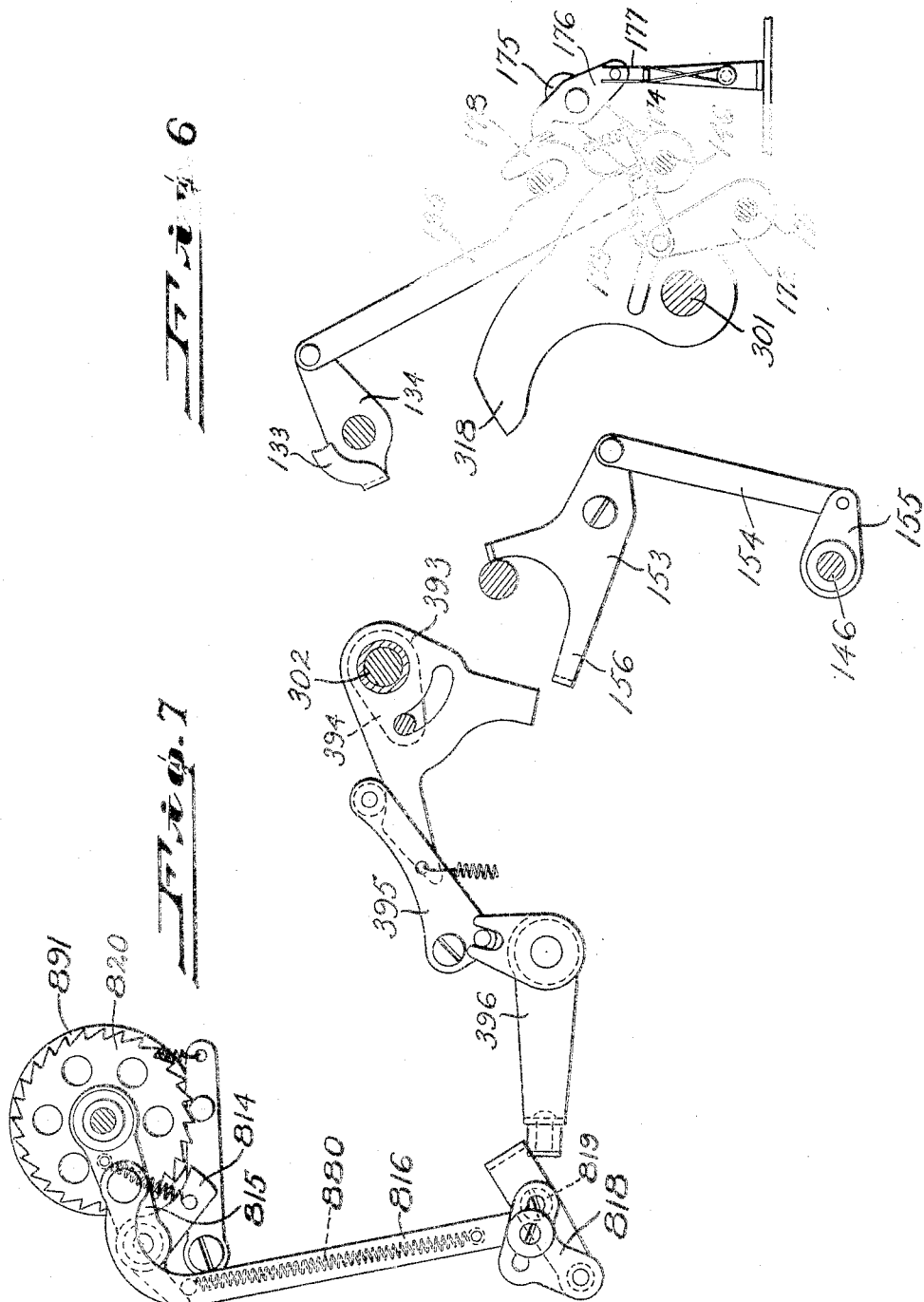
INVENTOR
Loring P. Crosman
BY
Stuart Wilder
ATTORNEY

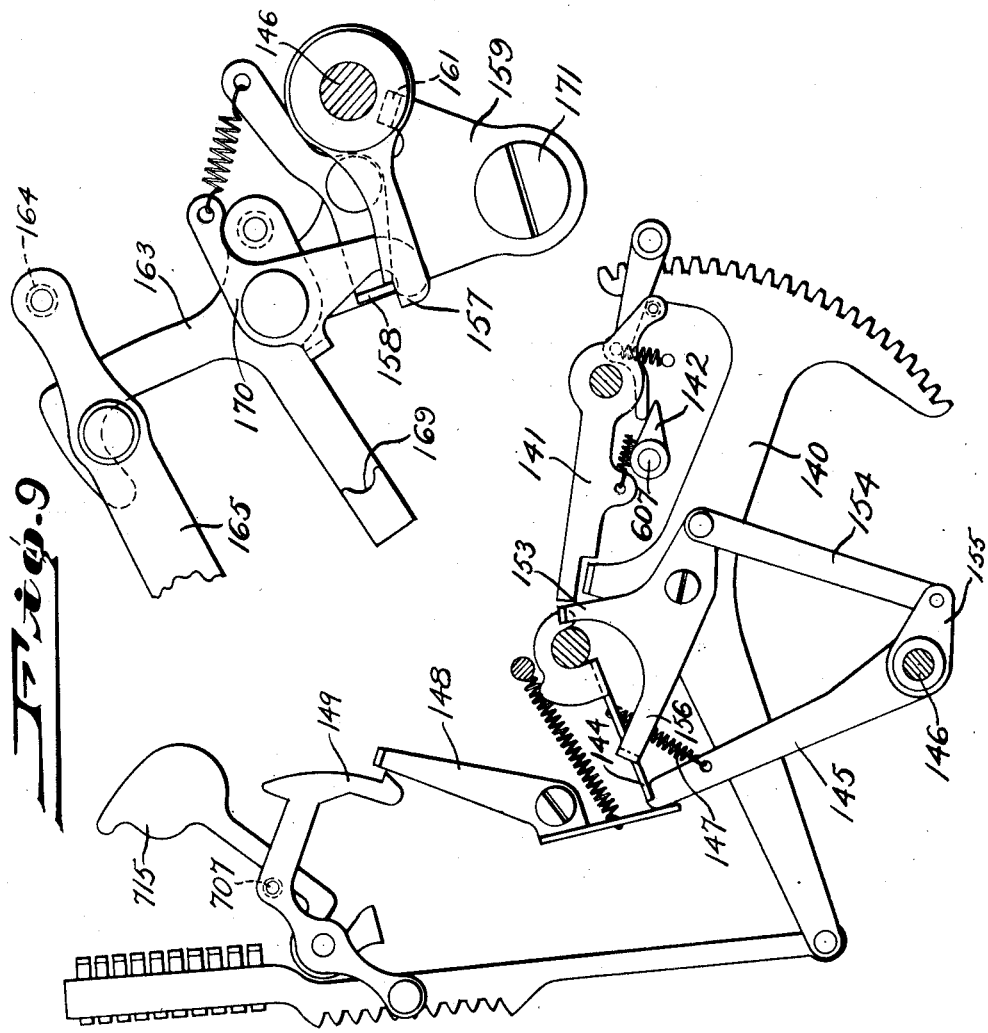

June 27, 1933.   L. P. CROSMAN   1,915,296
REGISTER
Filed Aug. 22, 1931    11 Sheets-Sheet 8

INVENTOR
Loring P. Crosman
BY
Stuart Hilder
ATTORNEY

June 27, 1933.  L. P. CROSMAN  1,915,296
REGISTER
Filed Aug. 22, 1931   11 Sheets-Sheet 9
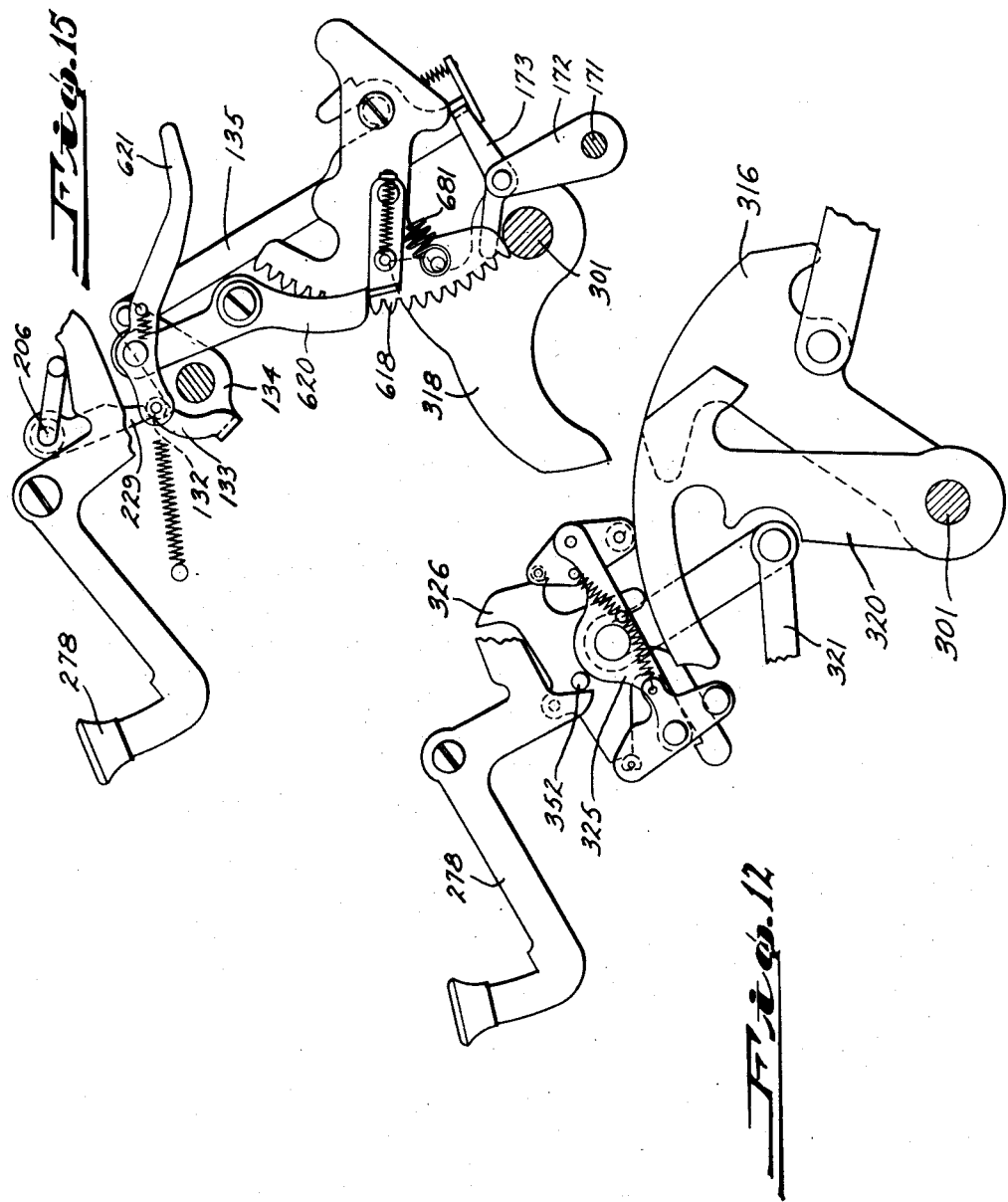
INVENTOR
Loring P. Crosman
BY
Stuart Hilde ATTORNEY

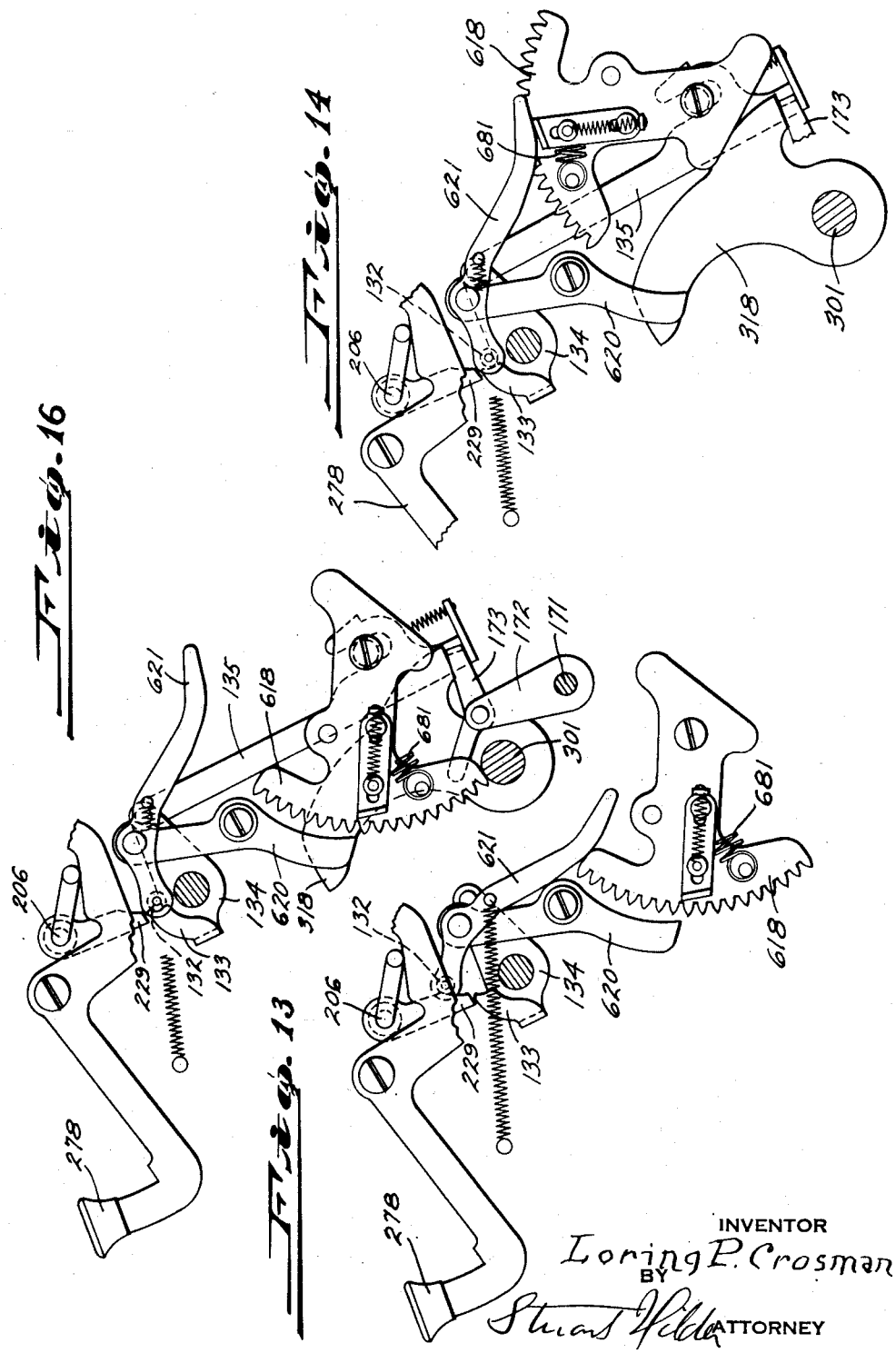

Patented June 27, 1933

1,915,296

UNITED STATES PATENT OFFICE

LORING P. CROSMAN, OF MAPLEWOOD, NEW JERSEY, ASSIGNOR TO GARDNER COMPANY, OF ORANGE, NEW JERSEY, A CORPORATION OF DELAWARE

REGISTER

Application filed August 22, 1931. Serial No. 558,665.

The invention relates to registers, and more particularly to means for registering true negative totals.

In adding and subtracting and in calculating machines totals which represent negative values commonly appear upon the register wheels as the complements of such values, so that an amount which is minus 18 would be registered as 99982, and if the total is printed, this complemental value will appear upon the slip, instead of the true negative total 18.

According to the present invention, when totals are taken, the machine operates as usual so long as the value registered is positive, but in case of a negative value, the complement will be automatically converted to the true negative total, and so displayed.

In the present application, the invention is shown as applied to a register of the Gardner type, disclosed in its essential features in the U. S. patents to Clyde Gardner, deceased, No. 1,882,180, issued October 30, 1931 and No. 1,867,002, issued July 12, 1932, both entitled Calculating machines.

The invention is also shown as utilizing certain improvements upon the above-noted structure, disclosed in U. S. application of Loring P. Crosman, entitled Register, filed February 25, 1931.

In the accompanying drawings, illustrating the invention:

Fig. 6 is a detail view of the total latch control devices.

Fig. 7 is a detail view of the line space mechanism.

Fig. 8 is a detail view of the negative total control devices.

Fig. 9 is a detail view of the control devices for locking the segment stops.

Fig. 12 is a detail elevation of the operation control devices.

Fig. 13 is a detail elevation of the total control mechanism in position assumed immediately after depression of the total key.

Fig. 14 is a similar view, showing the parts in position assumed after operation of the total setting spring.

Fig. 15 is a similar view, showing the parts in position assumed upon relatching of the total segment.

Fig. 16 is a similar view, showing the parts in position assumed upon automatic tripping of the total segment.

Addition and subtraction

Figure 1:
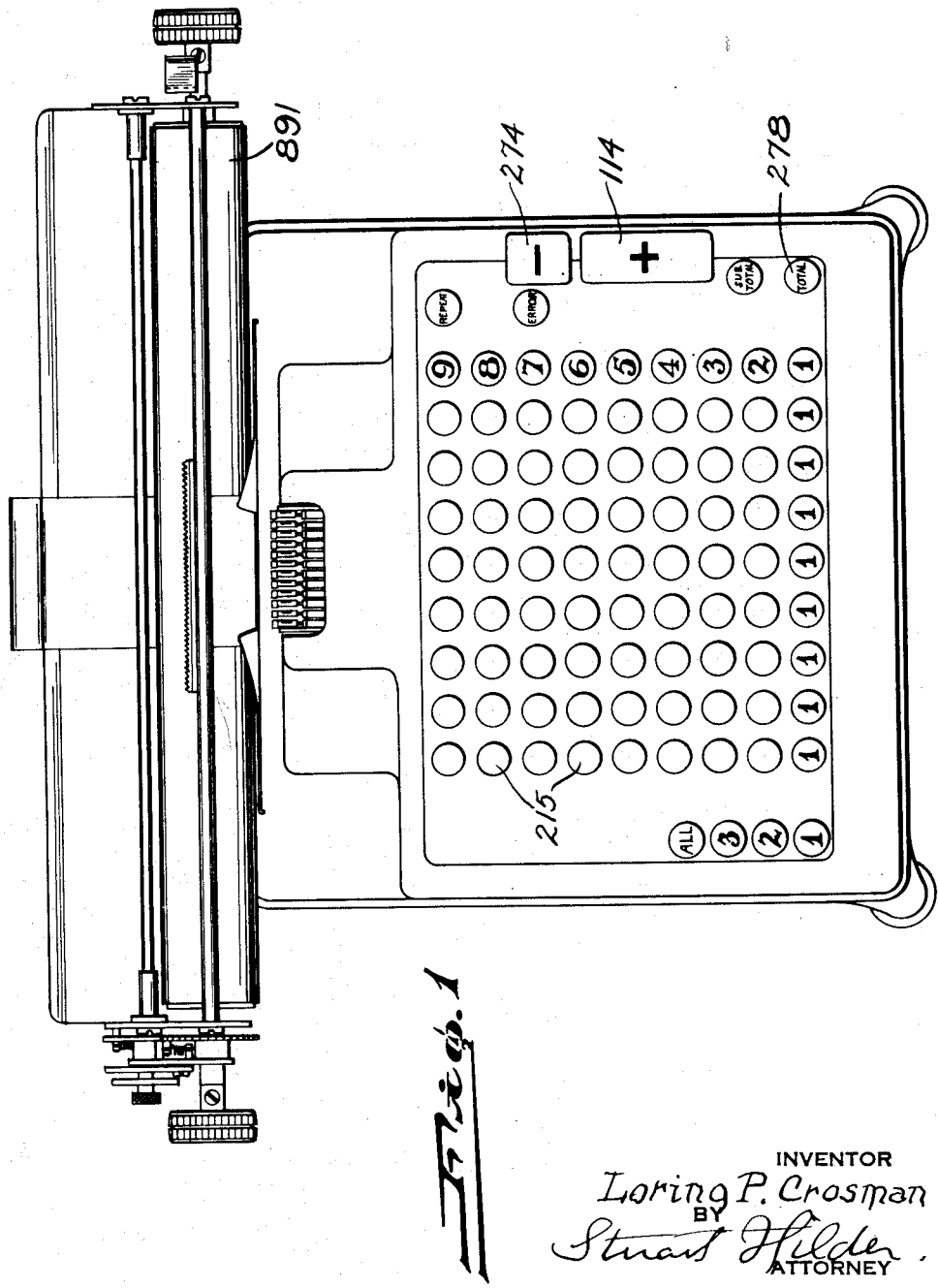
Fig. 1 is a plan view of a calculating machine embodying the invention.
Figure 2:
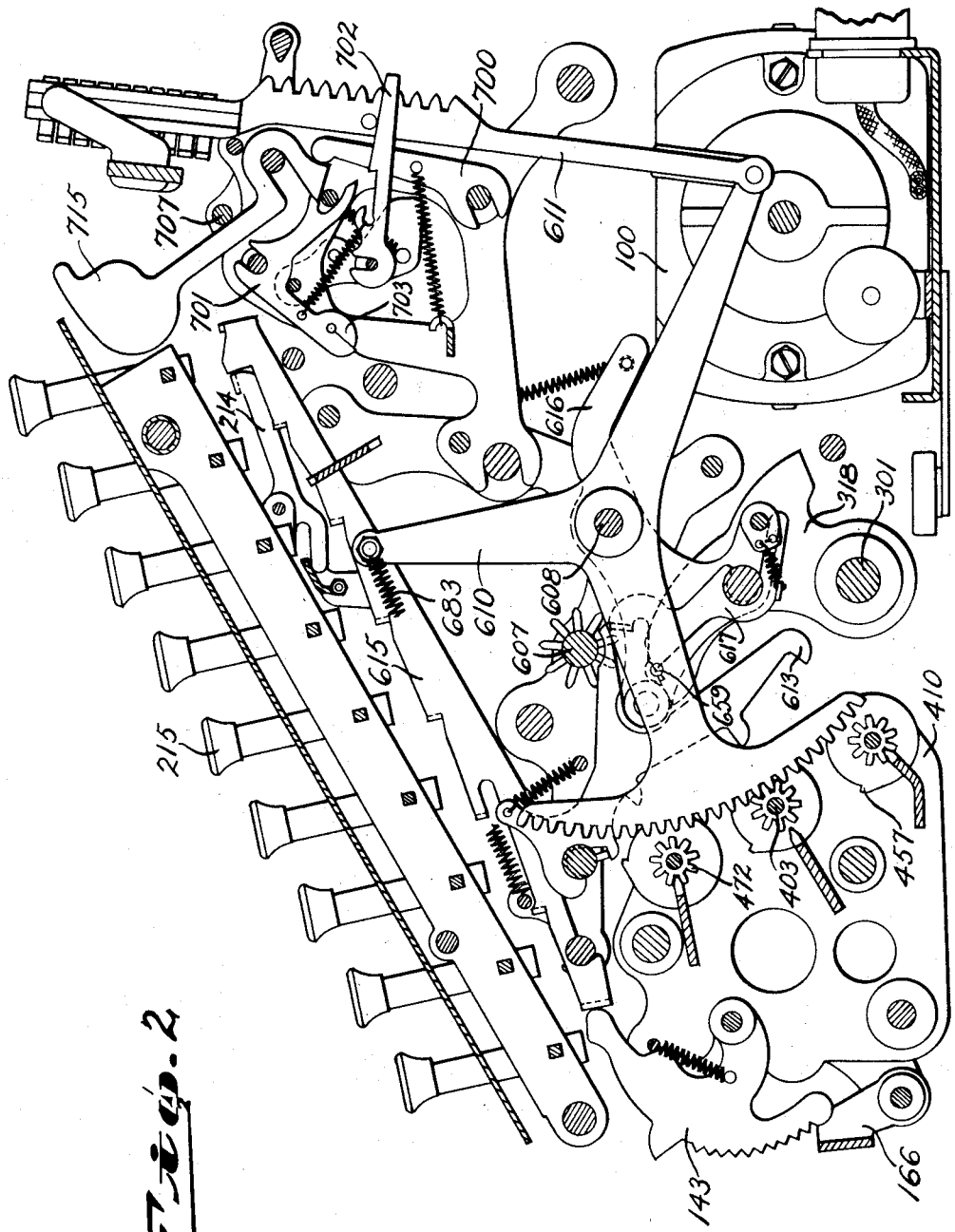
Fig. 2 is a transverse section, showing the registering and printing mechanism.

For each denominational order, the machine is provided with a three-armed actuator lever, numbered 610 on the drawings, (Fig. 2), these levers being loosely mounted on a shaft 608. The forward arm of each lever 610 terminates in a segmental registering rack; the rearward arm has a lister type bar 611 pivoted thereto, and the upper arm has pivotal connection with a differential stop bar 615 cooperating with a bank of digit keys 215 to limit the movement of the lever 610.

The digit keys 215 which have been depressed to represent a value are latched in position with the bottoms of their stems lying in the path of movement of the related stop lugs of the bars 615, allowing such bars to advance a distance proportional to the value of the key, upon operation of the machine. Depression of a digit key will also remove a column latch 214 from the path of movement of its related bar 615, these latches preventing movement of a stop bar and lever 610 in any column in which no key is depressed.

A rock shaft 301 is provided with cam means 318 for governing the movement of a spring tensioned rocker frame 616, mounted on shaft 608, frame 616 carrying a series of dogs 617 normally engaged by studs 659 of the levers 610. As shaft 301 is rotated forwardly, frame 616 will be rocked, and any of the levers 610 which have been released by the depression of digit keys will be allowed to rotate, under the influence of their springs 683, until they are stopped by the lugs of bar 615 contacting with the stems of the keys. Upon rearward rotation of shaft 301, the dogs 617 will return the operated levers 610 to normal position. This excursion of the levers 610 serves to register amounts set in the keyboard upon one or more accumulators and to set up a similar amount on the printing line of the type bars.

Figure 3:
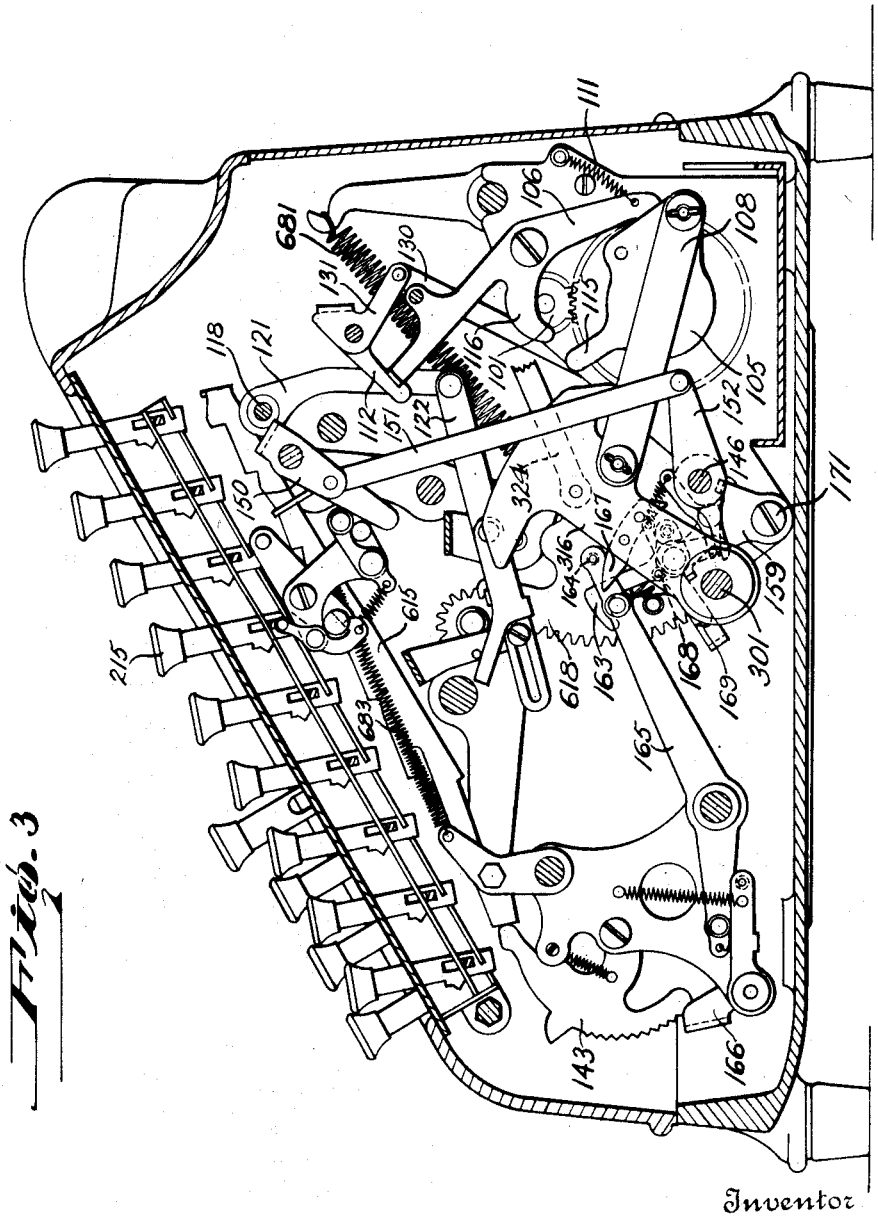
Fig. 3 is a transverse section, showing the clutch control mechanism, etc.

Shaft 301 is oscillated by means of an electric motor 100, connected through gearing 101 (Fig. 3) and suitable clutch means, with a crank arm 105, connected to an arm 316, fast with shaft 301, by means of a connecting rod 108, so that as crank arm 105 is rotated shaft 301 will be oscillated.

Figure 4:
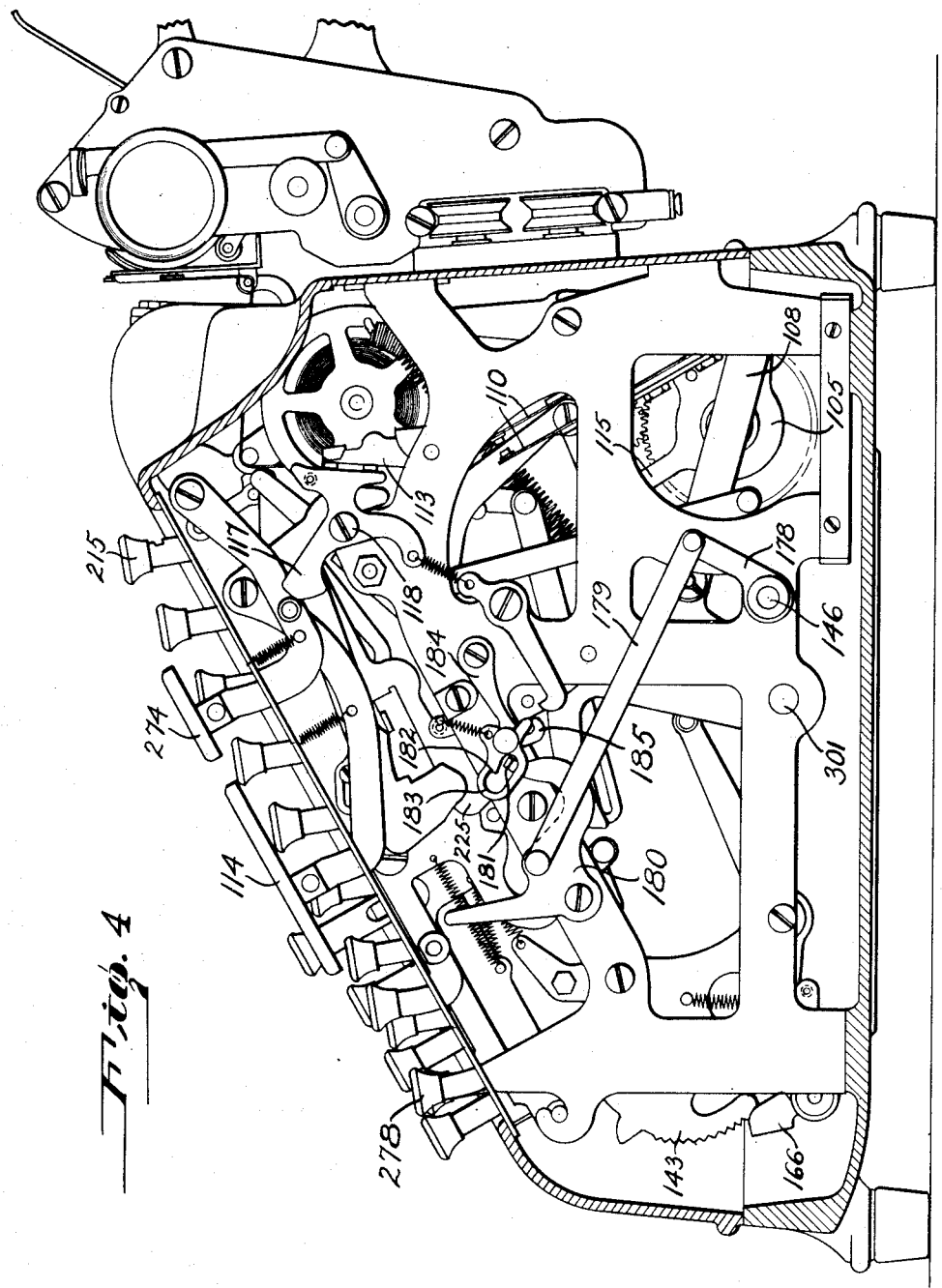
Fig. 4 is a right-hand side elevation of the machine, with the casing broken away.

Clutch lever 106 is provided with an insulated roller adapted to close contact members 110 (Fig. 4) after lever 106 is moved out of restraining engagement with the spring operated clutch. Contacts 110, constitute circuit breaking devices in the electrical connection of motor 100.

Spring 111 tends to pull lever 106 away from the clutch, the lever being normally held in engaging position by means of a latch 112. Latch 112 is controlled by a trigger 113, lying in the path of movement of a lever arm connected with an add key or plus bar 114. Upon depression of key 114, trigger 113 will release latch 112 and clutch lever 106 will be pulled out of engagement with the clutch to start the machine in operation.

Upon release of key 114 latch 112 will return under spring action into latching position, and toward the end of the cycle of operation an arm 115 connected with the crank member 105 will contact with a tooth 116 of the clutch lever 106 and will force said lever back into latching position, breaking the electric circuit and bringing the end of lever 106 into the path of movement of the rotating clutch member.

The above-described excursions of the levers 610 effect positive or negative registration of values set up in the keyboard in the following manner:

The segmental racks of the levers 610 are designed to operate the accumulator wheel gears 472 (Fig. 2) of one or more accumulators. These accumulators are shown in Patent 1,867,002, as means for storing positive or negative totals, to be printed. Tens carry mechanism is provided, according to the disclosure of Patent 1,828,180.

The accumulator shafts 403 are slidably mounted in slots of frame plates 410, and when any or all of the accumulators are set to active position, the gears 472 thereof are brought into mesh with the racks of the levers 610, where they are held, against spring tension exerted on shaft 403, by a rocking cam plate 419, engaging said shaft.

Figure 5:
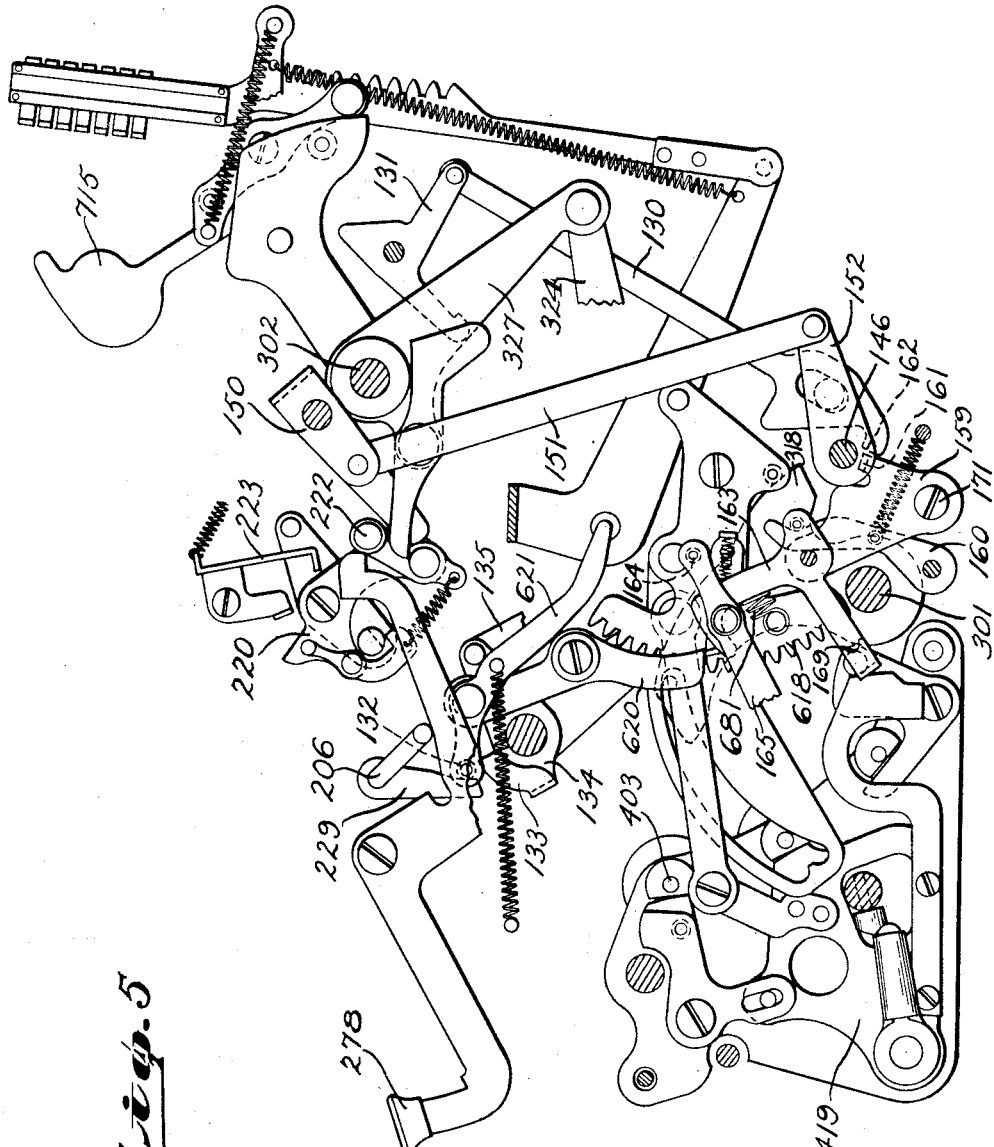
Fig. 5 is a side elevation of the totalizing mechanism.

Normally this cam plate is set (as in Fig. 5) to provide for additive registration, wherein the accumulator shaft 403 will be moved away from the racks of levers 610 before said racks are allowed to move, and will be moved to reengage the gears 472 while the racks lie in the extreme positions permitted by the keys 215 and stop bars 615. As shaft 301 is returned, and the racks are raised, the value set in the keyboard will be additively transferred to the register.

In order to register items negatively in one or more accumulators without leaving the mechanism set for this type of operation, a subtract key or minus bar 274 (Fig. 4) is located adjacent the plus bar 114. The free end of the subtract key lever is adapted to contact with and rock a plate 117 in a clockwise direction as viewed in Figure 4, said plate in turn operating the trigger 113 to release latch 112 and start the machine in operation. Plate 117 is secured upon the end of shaft 118, which runs across the machine, said shaft having an arm 121 (Fig. 3) secured thereon and having a link connection 122 with the control devices of the cam plate 419. The cam plate is connected, through link 321 (Fig. 12), with a rocker 325, provided with two cam followers adjustable by a plate 326 (engaged, for instance, by the link 122) to cooperate differentially with two cam arms, 316 and 320, on shaft 301, so that rocker 325 and cam plate 419 will be moved and the segments meshed and unmeshed with the accumulator gears at the proper times. These control devices are fully described in Patent 1,867,002, and when readjusted by forward movement of link 122, upon depression of the minus bar, the time at which the accumulators are shifted out of and into mesh with the segmental racks is changed, so that the accumulators remain in mesh during the first or downward stroke of the racks, and consequently register subtractively. During the upward stroke of the racks the accumulators are released from the action of the cam plate 419 and are pulled out of mesh by their springs.

*Total printing*

A total is taken by releasing the differential stop bars 615 and allowing them to rotate the accumulators subtractively until suitable pins on the accumulator wheels contact with 0 stop members. This will set the total in the type bars, and the hammers will be tripped to print the total. The bars 615 are then reengaged with the oscillating frame and during the return stroke of said frame are moved rearwardly to normal position, the accumulator wheels being disengaged from the racks before the return stroke is made, whereby the register which has been totalized will stand at 0.

The machine is set for subtractive operation by contact of the total key lever with a pin 352 (Fig. 12) on rocker control plate 326, the total key thus holding the plate free of the forward cam follower, so that the accumulators will not be disengaged at the beginning of the operation, by the action of cam arm 320. On the return stroke of the parts, the forward cam follower, coacting with cam arm 320, will disengage the accumulators from the segments. The described setting of plate 326 also disables the rear cam follower.

Depression of the total key 278 (Fig. 5) will not only trip the column latches 214 (Fig. 2), through pin 263 and rocker 227, but will also trip a latch 620, through operation of a control arm 621 pivotally connected to said latch. Latch 620 normally engages a lug on total segment 618, preventing movement of said segment under the influence of the total spring 681. Upon tripping of the latch, segment 618 will operate a shaft having a spirally arranged row of pins 651, acting to trip the latching dogs 617 successively from right to left of the machine, the tripping of said dogs releasing the segments and also releasing stop members 613 (Fig. 2), so that they will fall into the path of the 0 stops 457 on the accumulator wheels. The successive release of the differential stop bars 615 by the latches 214 is essential because of the character of the tens transfer mechanism employed between the accumulator wheels. As described in Patent 1,828,180, hereinbefore referred to, this carry mechanism is of the "crawl" type, wherein every unit of movement of a lower order wheel will transmit one-tenth of a unit of movement to the next adjacent higher order wheel. Therefore, in zeroizing, as each lower order wheel is returned to 0, it will subtract from the higher order wheel the fractional movements previously transmitted.

When this zeroizing operation has progressed to the left hand side of the machine, a rearwardly extending arm of the total segment 618 will contact with a projection of a rod 130 (Figs. 3 and 5) connected at its other end to a trigger 131, adapted to release latch 112, to start the machine. The machine being put in operation, frame 616 will carry the dogs 617 forwardly, so that they will snap under the stop members 613 and studs 659 of the segment levers. The hammers will now be tripped, and upon rearward movement of frame 616 the segments and total stops will be restored to normal position.

The total key is locked in depressed position, and is released near the end of the cycle of motor operation by engagement of a finger of arm 327 above a click pawl 222 of latch striker 220, the parts of the total setting mechanism being then restored to normal position as follows:

In tripping the total segment latch (Fig. 5), shaft 206 is rocked, an arm 229 on said shaft contacting with a pin 132 in the latch-operating arm 621. The latch being tripped, and total segment 618 rising, the latching lug of the segment will be brought in contact with lever 621, moving pin 132 out of contact with arm 229 and into contact with a shoulder 133 of a rock plate 134, pin 132 being held against said shoulder by the latch spring. During the following motor operation of the machine, the forward movement of rocker cam 318 will release a spring tensioned push rod 135 (Fig. 6) connected with rocker plate 134, and shoulder 133 will be rotated until pin 132 comes below arm 229, restoring latch 620 and arm 229 to normal position by the action of the latch spring, as soon as the total key is released, thus concluding the totalizing operation.

The type bars 611 are provided each with a row of type, representing the digits 1 to 9 and 0, the 0 or zero type being normally on the printing line. When the levers 610 are moved in accordance with a key setting or an accumulator registration, the related type bars will be raised to bring the appropriate type to the printing lines.

The type hammers 715 (Fig. 2) are adapted to be operated by spring actuators 700, but are normally held in tensioned position by latches 701. When a type bar is lifted, a tripping finger 702 is allowed to move into engagement with the corresponding latch 701, and at the end of the forward rotation of shaft 301, a frame upon which the tripping fingers are mounted is moved forwardly, releasing the hammers from those latches which have been engaged by the fingers 702. In order to print the zero characters in the lower order places wherein no amount from 1 to 9 has been set up, the higher order latches 701 are provided with offsets 703, lying in the planes of and designed to trip the lower order latches.

The hammers are restored and relatched during the return rotation of shaft 301 by means of a bail 707, operated through a reciprocatory cam.

At the end of each registering or totalizing operation the record paper platen will be rotated by a line space mechanism (Fig. 7), operated from a shaft 302, oscillated by means of a link connection 324 (Figs. 3 and 5) between the cam arm 316 and an arm 327 of shaft 302. The forward excursion of cam arm 316, oscillating shaft 302, will move arm 394, plate 393, levers 395, 396, and 818, (fulcrumed at 819) link 816, and arm 815, allowing pawl 814 to rise, through the action of spring 880, and engage with platen ratchet 820. The return movement of the parts will act to restore link 816 to normal position, advancing the platen and disengaging pawl 814.

Negative totals

In taking a total, amounts carried up to the accumulator wheel located to the left of the keyboard are transferred to the printing devices by means of a two-armed lever 140 (Fig. 8), similar to the levers 610, but having no connection with the keyboard. This lever 140 is normally held inactive by a latch 141, which in total taking is tripped by a finger 142 on the shaft 607 controlling the successive release of the segments.

If the total is negative, the complemental registration in the accumulator will include a nine in the above-mentioned left hand wheel, and the movement of lever 140 from eight to nine printing position is utilized to set the true negative total devices in operative position.

It will be noted from the above that the first step in total taking is the same, whether such total be positive or negative, the accumulator being zeroized and the total being set up in the type bars. It will also be obvious that, owing to the "crawl" type carry mechanism, it would be impractical to determine, by the position of lever 140, or of its accumulator wheel, whether an amount standing in a given accumulator was of positive or negative character, until the total segment 618 had operated, and the type bars had been set.

Figure 11:
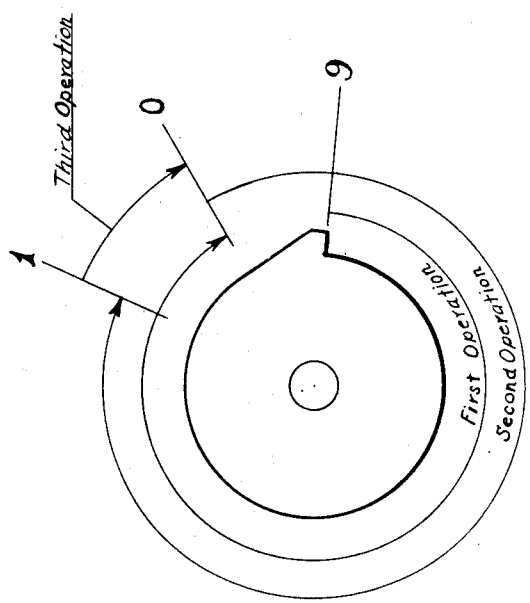
Fig. 11 is a diagram illustrating the three operations of the register performed in taking a negative total.

The method of converting the complement of a negative total, set in the type bars, to the true negative total is as follows:

A set of stops 143 (Fig. 2), yieldably engaging the stop bars 615 are locked in position as adjusted thereby in accordance with the complemental registration and the segments 610 are restored idly to normal position. The segments are now again released and will be stopped by the stops 143, the accumulator being meshed during this subtractive stroke of the segments, whereby the complement is subtracted from zero, giving a registration of the true negative total. The segments are again restored idly to normal position by a cycle of operation of frame 616, and the stops 143 are released, so that a second zeroizing operation will now transfer the true total to the type bars. The printing of the total, which normally occurs at the end of the first total setting operation has in this case been delayed, and will occur after the true total is set. The above sequence of operations is illustrated in the diagram, Fig. 11, wherein an accumulator wheel registering minus 1 is indicated. These operations involve three cycles of motor operation and two total setting actions of segment 618.

Figure 17:
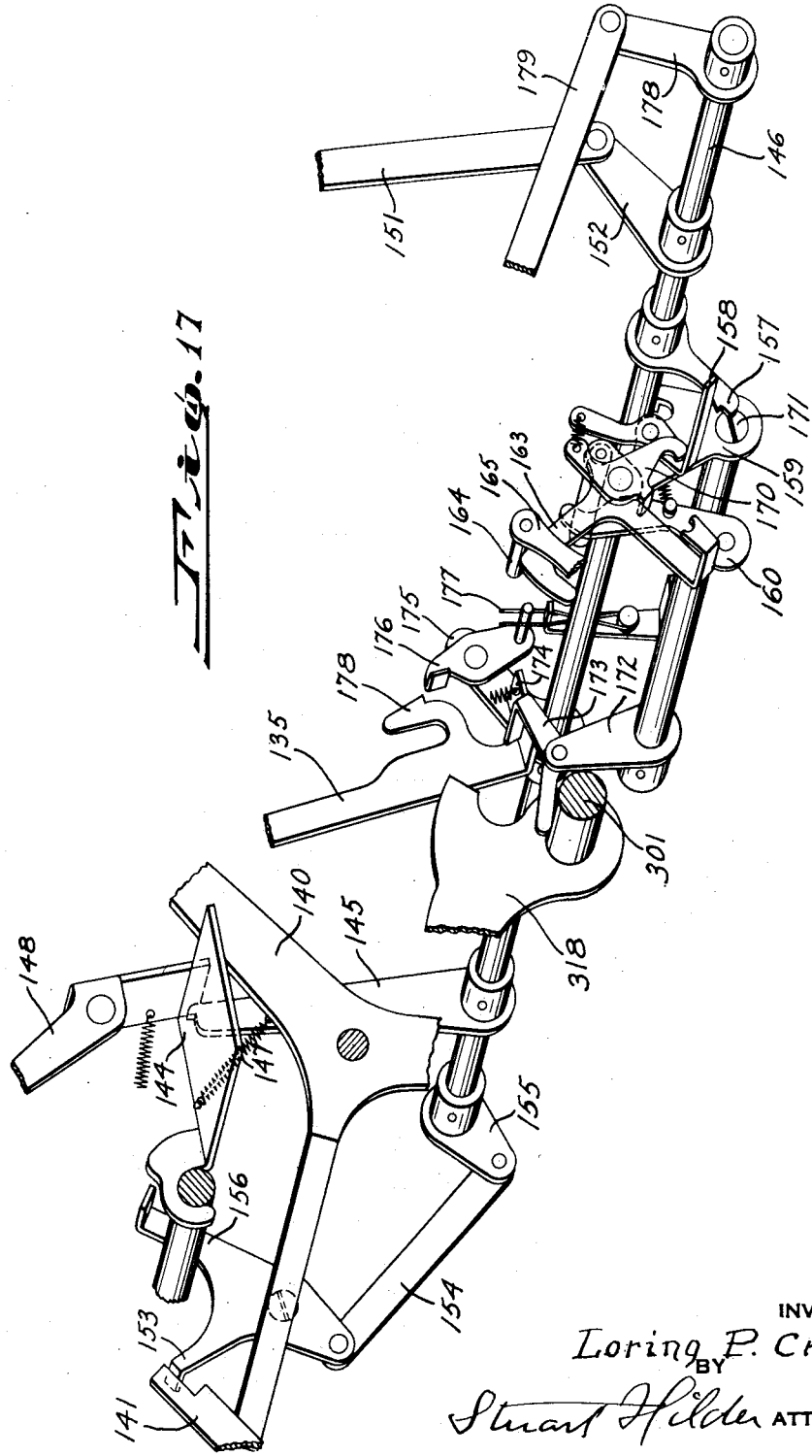
Fig. 17 is a detail perspective view of the negative total setting shaft and associated parts, shown in a position taken during operation.

In moving from eight to nine printing position, lever 140 contacts with a latch plate 144 Figs. 8 and 17 and moves the same out of engagement with an arm 145 of setting shaft 146, which will thereupon be rocked, by spring 147. The rocking of shaft 146 suspends the operation of the printing and normalizing devices as follows:

A printing operation is prevented during the conversion of the complemental amount on the totalizer by means of a spring actuated arm 148 which is released by the rearward movement of arm 145 and will thereupon engage a latch 149 of the hammer restoring bail 707, latching said bail in position to prevent printing operation of the hammers 715 (Fig. 8).

The release of the total key from its latch 223 (Fig. 5) is prevented by an arm 150 connected by link 151 with arm 152 of setting shaft 146, arm 150 being held in the rocked position of the shaft in engagement with pawl 222 mounted on the latch striker 220, so that said pawl may not be operated to actuate the striker so long as setting shaft 146 remains in rocked position. Total key 278 thus remaining latched in operative position, the subsequent operations will all be of a subtractive nature, and the column latches 214 will remain inactive due to the total key remaining latched.

The latch 141 (Fig. 8), controlling the two armed lever 140 and the extreme left hand type bar, having been tripped in the total setting operation, is held out of latching position when the total is negative by a pivoted member 153, engaging beneath said latch, member 153 being connected by a link 154 with an arm 155 of setting shaft 146. Lever 140 being free from latch 141 will operate to its extreme degree of movement in the subtractive true negative total setting operation of the accumulator hereinbefore referred to, and will thereby subtract nine from the accumulator wheel with which it is engaged, whereby the subtractive carry transmitted to this wheel during this same operation will be neutralized. This arrangement is employed because of the absence of a stop bar 615 and stop 143 related to the left hand wheel.

The line spacing of platen 891 is prevented by an arm 156 of the pivoted member 153 (Figs. 8 and 7), said arm taking a position beneath the plate 393 of the line spacing mechanism and preventing the operation of such mechanism by the spring 880.

The first operation of the totaling mechanism under the influence of spring 681 has served to engage the motor clutch, for the purpose of restoring the segments, etc., and in order that a second cycle of the motor drive mechanism may be secured, in which the subtractive operation of the accumulator will occur, the clutch will be held in operative position as follows:

A latch arm 157 Figs. 9 and 17 will be carried downward by shaft 146 out of engagement with a latching pawl 158 mounted on a plate 159, pawl 158 being held upward, to permit the disengagement, by a second latching pawl 170. Plate 159 being released from the latch, will be drawn rearwardly by spring pressed member 160 (Fig. 5) and a lug 161 of plate 159 will engage lug 162 of a link 130 (now in its lower position) connected to the trigger 131, holding this trigger out of latching engagement with the clutch lever 106.

In order to lock the segment stop members 143 in the positions assumed during the preliminary total taking, the plate 159 is provided with a pivoted extension 163 (Figs. 3 5 and 9) which, in the rearward movement of plate 159 is held under tension against the pin 164 mounted on one end of an intermediately fulcrumed lever 165. The consequent relative movement of plate 159 and extension 163 will release latching pawl 158 from the restraint of the second latching pawl 170, the former pawl falling upon latch arm 157. The forward arm of lever 165 operates a locking bail 166, engaging serrations of the stops 143, the lever being normally operated by a double faced cam 167 secured to arm 316 of operating shaft 301. As arm 316 moves forward rocking bail 166 is released, by the action of cam 167, while in the rearward movement of arm 316 the cooperating roller of lever 165 will ride the upper face of cam 167, whereby the locking bail is brought into contact with the stops 143. This will be the operation of the parts during the first cycle of motor operation, which restores the segments. As the rear end of lever 165 is lifted by cam 167, however, in the return movement of the parts, pin 164 will be lifted free of extension 163, and said extension will immediately move under the pin, holding locking bail 166 in engaging position, where it will remain during the subtractive stroke of the second cycle of motor operation, that is is to say, while the segments move the wheels subtractively from 0 registering position to the extent allowed by the stops 143. At the end of this stroke a pin 168 in arm 316 will engage a seat 169 in extension 163 and will move plate 159 and its extension 163 forwardly, in which position the parts will be held by latching pawl 158, moving into engagement with the shoulder of latch arm 157.

The true negative total being now registered in the accumulator, the second totalizing operation occurring on the final motor operation cycle and, accomplished by the means hereinbefore described, will result in the printing of the true negative total. The total latch is controlled to initiate this second totaling operation as follows:

It has been seen that, because of the negative condition of the accumulator, the total key is held in depressed position, which, ordinarily, would result in the tripping of the total latch 620 at the end of the cycle of motor operation (first cycle) which serves to restore the segment levers 610. This tripping action would occur because pin 132 in the latch-operating arm 621 (Fig. 5), held depressed by key 278 and arm 229, is contacted by shoulder 133, as rocker cam 318 restores push rod 135 to normal position, tripping latch 620.

This tripping action is delayed until the completion of the subtractive operation of the machine by the adjustment of a member 173 (Fig. 6) pivoted upon an arm 172 of shaft 171, said member lying normally between rocker cam 318 and push rod 135. Shaft 171 is rigid with plate 159, and, as said plate moves rearwardly at the end of the first total setting operation, pivoted member 173 will be carried out of register with rocker cam 318, so that, upon the subsequent return of said cam to normal position, push rod 135 will not be operated. During the subtractive cycle of operation, however, plate 159, being restored to normal position by pin 168 and part 169, pivoted member 173 will be restored to position beneath rocker cam 318, and at the end of this cycle the push rod will rock plate 134 and trip the total latch.

This tripping movement of push rod 135 is utilized to restore setting shaft 146 to normal position. For this purpose shaft 146 is provided with an arm 175 carrying the pawl 176 which, as shaft 146 is rocked forwardly is held by spring 177 in contact with a shoulder 178 of push rod 135. As the rod is moved downwardly, pawl 176 and arm 175 will rock the setting shaft back to normal position. Setting shaft 146 and the parts controlled thereby being restored to normal position, and total latch 620 being tripped, an ordinary total taking operation will now occur.

Figure 10:
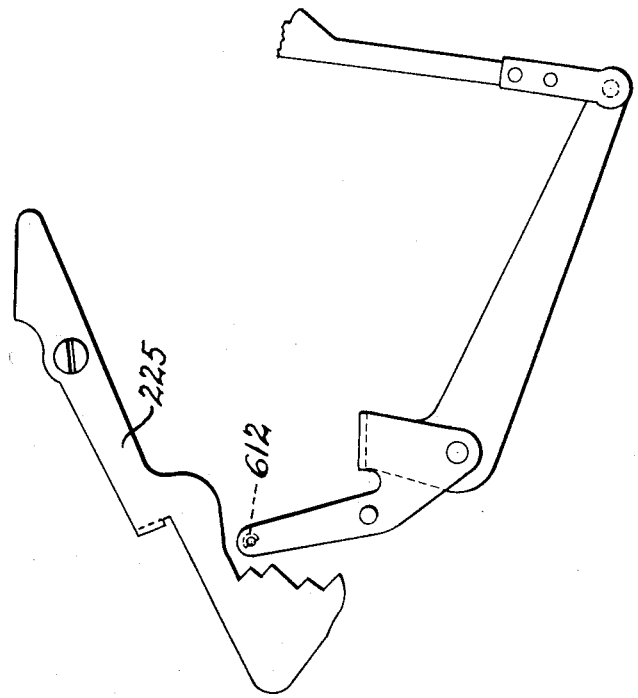
Fig. 10 is a detail view of the special type symbol control devices.

A special type bar, bearing symbols designating different operations of the machine is adjusted to align the total symbol on the printing line by means of a pin 612 (Fig. 10) engaging the appropriate notch of a stop lever 225. In case of a negative total the symbol is changed as follows:

Setting shaft 146, through arm 178 (Fig. 4) and link 179 operates a pivoted member 180 so that in the forward movement of the shaft a lug 181 of member 180 is brought in front of a lug 182 of a pawl 183 mounted upon an arm 184.

A setting shaft 146 is restored to normal position lug 181 will move pawl 183 and arm 184 downward so that a hook 185 of said arm will stand in the path of movement of the symbol type pin 612, holding the symbol lever in a position different from that assumed when the pin engages the shoulder of member 225, and bringing the negative total symbol type to the reading line.

I claim:

In a register having a totalizer and total printing devices; means for transferring a total from said totalizer to said printing devices and for effecting the printing, including means settable by the highest order printing element in the adjustment thereof in accordance with a complemental registration on said totalizer, and means controlled by said settable means and operable to change a complemental setting in said printing devices into the equivalent true negative amount.

Signed at Orange, in the county of Essex and State of New Jersey, this 21st day of August, A. D. 1931.

LORING P. CROSMAN.